June 16, 1953  R. E. J. SHAVE  2,642,480
INDICATOR FOR EUTECTIC COOLERS
Filed Aug. 12, 1949  2 Sheets-Sheet 1

Inventor
Ralph Ernest John Shave
by Sommers & Young
Attorneys

June 16, 1953　　　R. E. J. SHAVE　　　2,642,480
INDICATOR FOR EUTECTIC COOLERS
Filed Aug. 12, 1949　　　　　　　　　　　2 Sheets-Sheet 2

Inventor
Ralph Ernest John Shave
by Sommers & Young
Attorneys

Patented June 16, 1953

2,642,480

UNITED STATES PATENT OFFICE 2,642,480

INDICATOR FOR EUTECTIC COOLERS

Ralph Ernest John Shave, London, England, assignor to J. Stone & Company Limited, London, England, a corporation of Great Britain Application August 12, 1949, Serial No. 109,865
In Great Britain September 9, 1948

5 Claims. (Cl. 175—183)

This invention concerns improvements relating to indicators or controls for coolers of the kind in which the latent heat of fusion of an eutectic is utilised for cooling purposes. The eutectic absorbs heat while changing from the solid to the liquid condition and solidifies when heat is removed from it.

Coolers of this kind, in the form of so-called plates, are advantageously used for the cooling of refrigerated transport vehicles, but heretofore a draw-back has been experienced in that it has not been possible readily to ascertain the amount of cold storage, or reserve of cold, available at any instant in the cold storage plates. This has been an important disadvantage, for the efficient control of these vehicles demands that a supervisor should be able easily to ascertain the amount of cold storage available for a given journey or period. The heat content, or the reverse of cold, cannot be measured thermometrically because the eutectic operates mainly at a constant temperature, during which time it is partly solid and partly liquid.

Now, it has been found by experiment that an eutectic solution when changing from the solid to the liquid state, or vice versa, produces a change of electrical resistance sufficient for reliably affecting an electrical instrument, so that the latter can be used for either indicating or controlling, or both, the amount of cold storage available. According to the present invention, therefore, indicating and/or control means comprises a pair of electrodes in, or in contact with, the eutectic and connected in the circuit of an electrical indicator or control means. It having been found that direct current is apt to set up excessive polarization inimical to the accuracy of the indication or control, the adoption of alternating current is preferred for practical purposes.

Various ways of carrying the invention into effect will now be more fully described by way of example and with reference to the accompanying drawings, in which—

Figure 1:
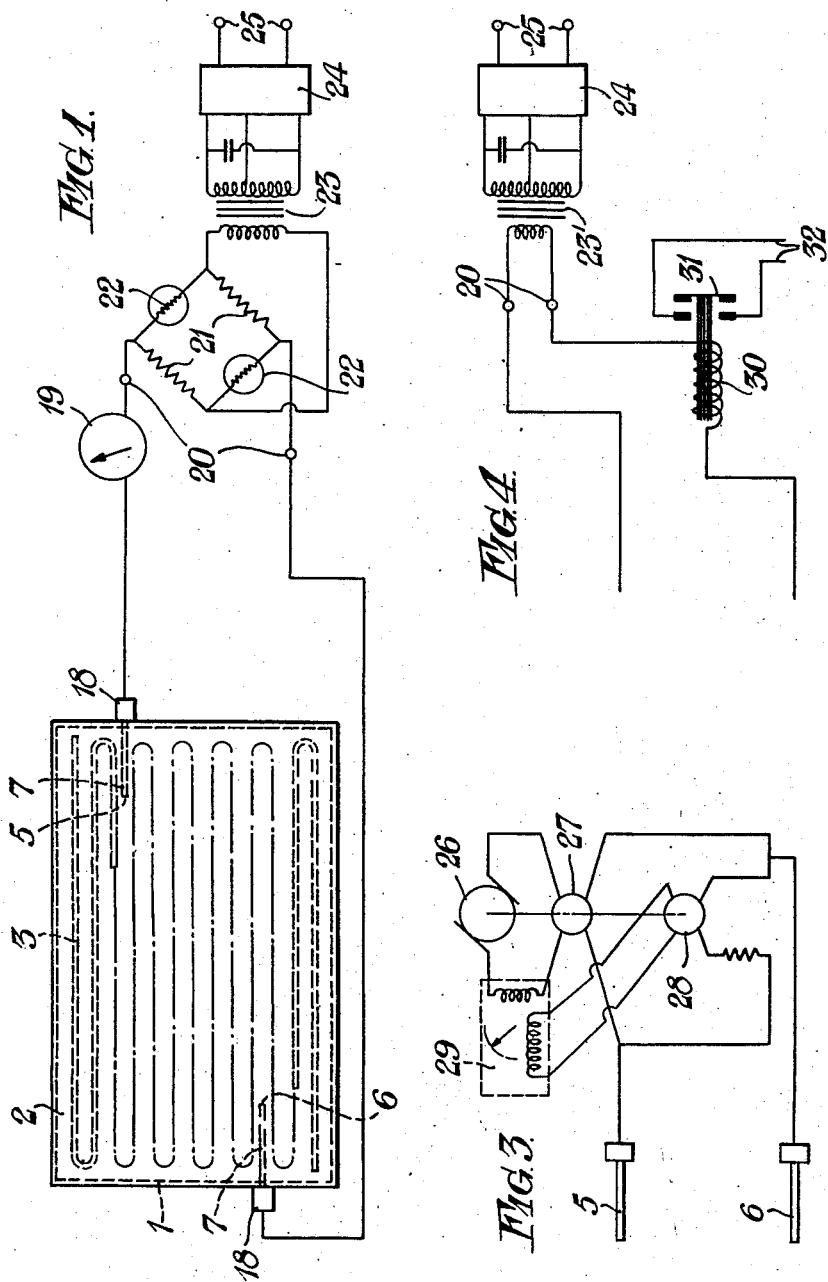
Figure 2:
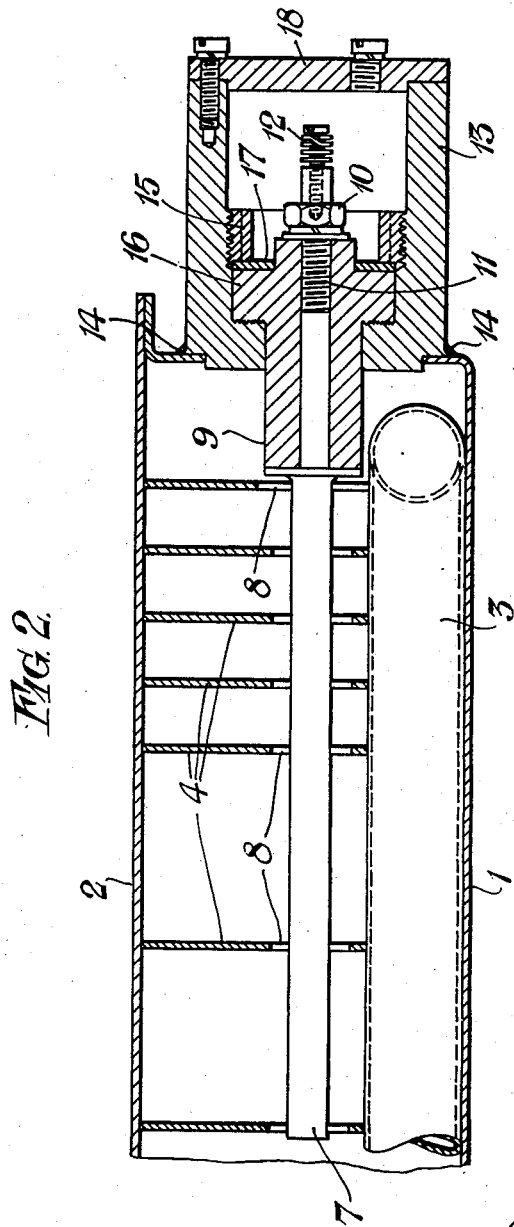

Figure 1 is a plan view of a cooler plate, the associated indicating circuit being shown diagrammatically, Figure 2 is a longitudinal section illustrating an electrode in position in the cooler to a larger scale, and Figures 3 and 4 are diagrams illustrating other forms of circuit.

The cooler plate or tank itself may be of known kind. That illustrated consists of a flanged casing 1 permanently closed by a cover 2 and furnished with a zig-zag pipe coil 3 which is connected, or can be connected, to refrigerating machinery whereby cooling liquid can be passed through the coil, from time to time, for cooling the eutectic solution sealed within the plate. The space within the plate is subdivided by so-called filler bars 4.

For the purposes of the invention, two electrodes 5, 6 are arranged in the plate, preferably near diagonally opposite corners and with their metal stems 7 disposed between turns of the pipe coil 3 as seen in plan (Fig. 1) and substantially at mid-depth (Fig. 2). The bars 4 are formed with holes 8 through which the electrode freely extends.

The stem 7, which should be of stainless or non-corrosive material having regard to the solution employed, is secured in an electrically insulating bushing 9 by a nut 10 on a reduced threaded end 11 of the stem which is also fitted to serve as a terminal 12. The bushing 9 is itself secured in a metal terminal box 13, which is welded to the casing 1 at 14, by means of an internal nut 15 bearing against a flange 16 on the bushing through a washer 17. The bushing 9 thus serves also as a liquid-tight seal between the stem part 11 and the box 13. The box is closed by a cover 18.

The indicating instrument employed may suitably be of the current-measuring type, the source of current being at a constant voltage. For obtaining a substantially constant A. C. voltage from an available D. C. source, such as that afforded by the normal lighting installation on a rail or road vehicle, use may be made of a vibrator-transformer combination of per se known kind. In the arrangement shown in Figure 1, in which the current meter 19 is an indicator only, a substantially constant A. C. voltage is provided across the terminals 20 by a voltage-regulating bridge circuit, comprising ordinary resistances 21 and barreters 22, which is supplied through a transformer 23 by a vibrator unit 24 connected to D. C. supply terminals 25.

Alternatively, the source of current may be a small hand-driven machine operated through a slipping clutch, i. e. a drive such as is common for insulation testers. The machine may be a simple alternator, or, as shown in Figure 3, use may be made of a commutator machine set comprising a D. C. generator 26 with a converter 27 affording A. C. and a rectifier 28 for reconversion to D. C. for the indicating instrument. In this example, the instrument 29 is an ohmmeter.

Apparatus such as has been described above enables a supervisor to obtain quickly a reliable indication of the reserve of cold storage available and to take steps for restoring this reserve should it appear to be inadequate.

If, instead of indication or in addition thereto, a control is to be exercised upon the refrigerating machinery as a function of the reserve of cold storage, so that the latter may be maintained more or less at a required value or above a minimum value, use may be made of a relay or other power-amplifying device for putting the machinery into and out of operation at given values or limits. In such cases, it is desirable to use an available source of current. The circuit arrangement shown in Figure 4 is similar to that of Figure 1 except that a so-called constant-voltage transformer 23' is used, so that the bridge circuit 21, 22 can be dispensed with. In place of or in addition to an instrument such as 19, a relay 30 is provided whose movable contacts 31 are lightly spring-loaded towards the open position. As the reserve of cold storage decreases, the current in the relay winding will increase until, at a predetermined value, the contacts 31 are closed to complete a control circuit 32 for the refrigerating machinery and, if desired, for a warning device. As the reserve is restored, the current will decrease until the relay acts to reopen the circuit 32.

For the eutectic solution, use may be made, for example, of potassium chloride, sodium nitrate, sodium chloride or ammonium nitrate. Whilst the characteristic curves (resistance in ohms against percentage cold storage remaining) of these solutions differ from one another, their general trend is such that the current-indication varies fairly uniformly with the percentage cold storage. With an initially open scale, a practically evenly divided scale of percentage cold-storage can be obtained.

I claim:

1. Apparatus for determining the reserve cold storage of an eutectic contained in a vessel, comprising a pair of electrodes spaced apart in the vessel in contact with the eutectic therein, a source of electric current connected in circuit with said electrodes so as to transmit current between said electrodes through the eutectic, and an electric measuring device dependent on the resistance to flow of current in said circuit through the eutectic for indicating at any time the cold storage reserve in the eutectic, said electrodes being located on opposite sides of the vessel so that the condition of the eutectic as a whole is reflected in the indication given by said measuring device.

2. Apparatus according to claim 1 and in which the source of electric current has a constant potential.

3. Apparatus according to claim 1 and in which the current is alternating.

4. Apparatus according to claim 1 and in which the source of electric current is a manually driven generator.

5. In combination with an eutectic cooler, apparatus for determining the reserve of cold storage therein comprising electrodes in contact with the eutectic in the cooler and a source of alternating current connected in circuit with said electrodes and comprised by a vibrator and a transformer for converting direct current to alternating current, an electrical current-sensitive device with which the said electrodes are connected for indicating the cold storage reserve of said eutectic, and regulating means for maintaining substantially constant the voltage applied to the electrode.

RALPH ERNEST JOHN SHAVE.

References Cited in the file of this patent

UNITED STATES PATENTS

| Number | Name | Date |
| --- | --- | --- |
| 513,421 | Rowland | Jan. 23, 1894 |
| 1,530,579 | Shipley | Mar. 24, 1925 |
| 2,183,492 | Rabl | Dec. 12, 1939 |
| 2,377,363 | Noble | June 5, 1945 |
| 2,453,584 | Newton | Nov. 9, 1948 |
| 2,506,775 | Calabrese | May 9, 1950 |
| 2,531,315 | Wyllie | Nov. 21, 1950 |